United States Patent
Gottschalk et al.

(10) Patent No.: US 9,212,617 B2
(45) Date of Patent: Dec. 15, 2015

(54) METHOD FOR RECOGNISING IRREGULAR COMBUSTION PROCESSES IN AN INTERNAL COMBUSTION ENGINE

(75) Inventors: Wolfram Gottschalk, Magdeburg (DE); Ulf Lezius, Gifhorn (DE); Matthias Schultalbers, Meinersen (DE); Samuel Trebesius, Wahrenholz (DE)

(73) Assignee: IAV GMBH INGENIEURGESELLSCHAFT AUTO UND VERKEHR, Berlin (DE)

( * ) Notice: Subject to any disclaimer, the term of this patent is extended or adjusted under 35 U.S.C. 154(b) by 382 days.

(21) Appl. No.: 13/994,180

(22) PCT Filed: Dec. 14, 2011

(86) PCT No.: PCT/DE2011/002121
§ 371 (c)(1),
(2), (4) Date: Jun. 14, 2013

(87) PCT Pub. No.: WO2012/095076
PCT Pub. Date: Jul. 19, 2012

(65) Prior Publication Data
US 2013/0268180 A1    Oct. 10, 2013

(30) Foreign Application Priority Data
Dec. 17, 2010    (DE) .......................... 10 2010 054 997

(51) Int. Cl.
*F02D 35/02* (2006.01)
*F02D 41/38* (2006.01)
(Continued)

(52) U.S. Cl.
CPC .............. *F02D 41/22* (2013.01); *F02D 35/023* (2013.01); *F02D 35/027* (2013.01);
(Continued)

(58) Field of Classification Search
CPC ................... F02D 2200/1015; F02D 41/3809; F02D 41/008; F02D 41/221; F02D 41/22; F02D 41/402; F02D 41/3005; F02D 2041/223; F02D 35/023; F02D 35/027; F02M 69/35; F02M 65/001; F02M 57/005; F02M 63/0275; F02M 2700/1394
USPC ............ 701/104, 102, 103; 73/114.43, 35.03, 73/35.07, 35.12; 123/478, 458, 456, 494, 123/198 D
See application file for complete search history.

(56) References Cited

U.S. PATENT DOCUMENTS 5,945,596 A * 8/1999 Burkel et al. .............. 73/114.38
6,088,647 A * 7/2000 Hemberger et al. .......... 701/104
(Continued)

FOREIGN PATENT DOCUMENTS

| DE | 19740608 C2 | 3/1999 |
|---|---|---|
| DE | 10127932 A1 | 12/2002 |
| DE | 102005036826 A1 | 2/2007 |
| DE | 102006003265 A1 | 8/2007 |
| DE | 102007024415 B3 | 1/2009 |
| DE | 102008027585 A1 | 12/2009 |
| EP | 1854993 A1 | 11/2007 |
| WO | WO 9835210 A1 | 8/1998 |

*Primary Examiner* — Lindsay Low
*Assistant Examiner* — George Jin
(74) *Attorney, Agent, or Firm* — Leydig, Voit & Mayer, Ltd.

(57) ABSTRACT

A method for recognizing irregular combustion in an internal combustion engine includes supplying fuel directly to a combustion chamber of a cylinder of the internal combustion engine using an injector. The injector is connected to a fuel supply line that includes a pressure sensor configured to measure pressure in the fuel supply line. The pressure in the fuel supply line is measured during the supply of fuel into the combustion chamber. It is then ascertaining whether irregular combustion is occurring based on the measured pressure in the fuel supply line.

10 Claims, 3 Drawing Sheets

(51) Int. Cl.
  *F02D 41/22* (2006.01)
  *F02D 41/30* (2006.01)
  *F02D 41/40* (2006.01)
  *F02M 57/00* (2006.01)
  *F02D 41/14* (2006.01)

(52) U.S. Cl.
  CPC ......... *F02D 41/3005* (2013.01); *F02D 41/402* (2013.01); *F02M 57/005* (2013.01); *F02D 41/1498* (2013.01); *F02D 41/3809* (2013.01); *F02D 2200/1012* (2013.01); *F02D 2200/1015* (2013.01); *Y02T 10/44* (2013.01)

(56) References Cited

U.S. PATENT DOCUMENTS

| | | | |
|---|---|---|---|
| 6,240,910 B1* | 6/2001 | Maekawa et al. | 123/529 |
| 6,929,192 B2 | 8/2005 | Schmauser | |
| 2008/0249699 A1* | 10/2008 | Wolber et al. | 701/107 |
| 2013/0204509 A1* | 8/2013 | Gottschalk et al. | 701/102 |

* cited by examiner

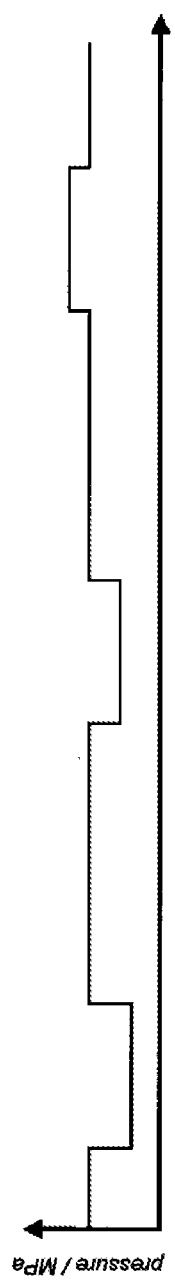
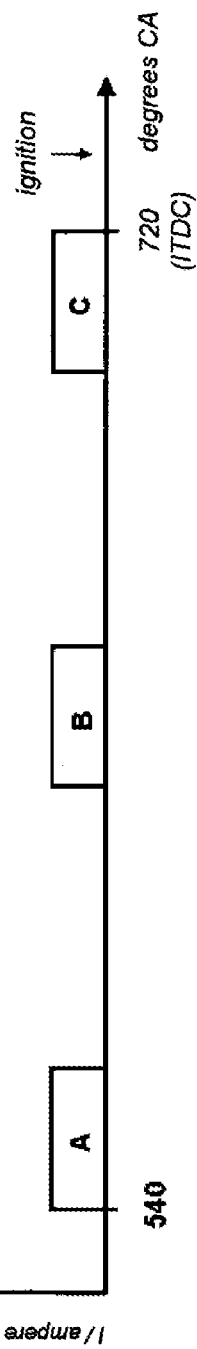
Fig. 2 A
Fig. 2 B
Fig. 2 C

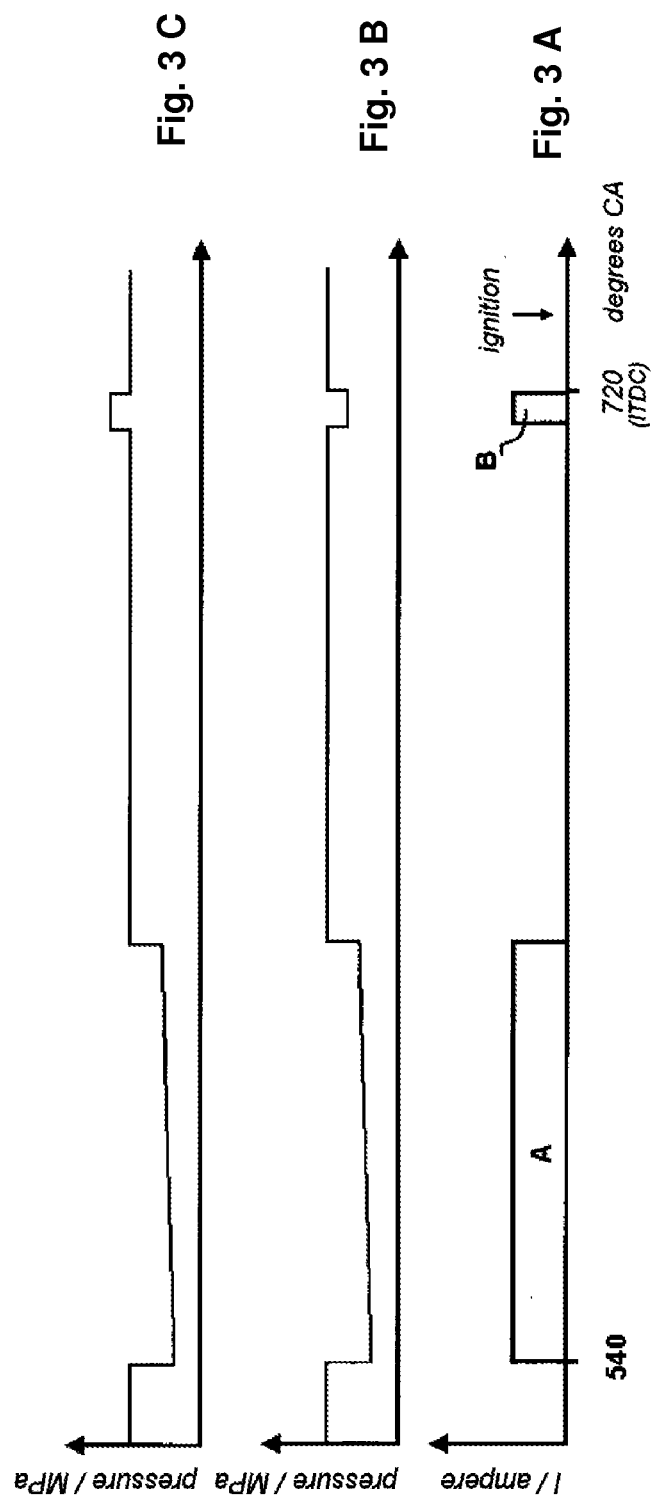

METHOD FOR RECOGNISING IRREGULAR COMBUSTION PROCESSES IN AN INTERNAL COMBUSTION ENGINE

CROSS REFERENCE TO RELATED APPLICATIONS

This application is a U.S. National Phase application under 35 U.S.C. §371 of International Application No. PCT/DE2011/002121, filed on Dec. 14, 2011, and claims benefit to German Patent Application No. DE 10 2010 054 997.5, filed on Dec. 17, 2010. The International Application was published in German on Jul. 19, 2012 as WO 2012/095076 A2 under PCT Article 21 (2).

FIELD

The present invention relates to a method for recognising irregular combustion processes in an internal combustion engine.

BACKGROUND

In internal combustion engines with externally supplied ignition there may be an increased tendency to pre-ignition, in particular in conjunction with high-pressure supercharging. An irregular combustion process in which portions of the fuel/air mixture are ignited in the combustion chamber even before the initiation of ignition by means of a spark plug is referred to as pre-ignition. Pre-ignitions as a rule are associated with a combustion-chamber pressure which is so greatly increased that damage may occur to the internal combustion engine. Knocking combustions are likewise already known as irregular combustion processes, but these are characterised in that after the initiation of an ignition by means of a spark plug portions of the not yet combusted fuel/air mixture are self-ignited, with the augmented flame fronts which are now present striking one another and causing the high-frequency cylinder-pressure vibrations characteristic of knocking combustion. Pre-ignitions may occur as early as in the compression phase. The causes of pre-ignitions are complex. Known causes which lead, individually or in combination, to pre-ignitions are self-ignitions at hot exposed points in the combustion chamber, charge inhomogeneities and an increased temperature level in the combustion chamber. Inter alia, the parameters of the charge cycle, such as valve timings, the amount of fuel or the combustion-air ratio, the charging pressure, the ignition-angle setting or parameters of the exhaust recirculation, have an influence on pre-ignitions. Externally-induced pre-ignitions, i.e. combustions which are triggered neither purely by reaction kinetics nor by the active ignition, are also referred to as auto-ignitions. For safe operation of an internal combustion engine, it is necessary to recognise every pre-ignition, both ones triggered by reaction kinetics and ones triggered by external induction, in order to take countermeasures immediately and to avoid further pre-ignitions.

A method for recognising pre-ignitions which is based on combined evaluation of the rate-of-rotation signal of the crankshaft and the signal of a knock sensor is already known from DE 10 2007 024 415 B3. If the rate of rotation of the crankshaft in the compression phase is reduced compared with a comparison value and the signal of the knock sensor indicates knocking combustion, it is concluded that pre-ignition is occurring. This method departs from the assumption that a pre-ignition/auto-ignition generates similar high-frequency pressure vibrations in the combustion chamber to knocking combustion. Tests have shown that this assumption is not always correct, i.e. no high-frequency vibrations are accompanied by pre-ignition. Furthermore, the effect of a pre-ignition on the rate-of-rotation signal of the crankshaft is slight and, in particular at a high rate of rotation of the crankshaft, detection of pre-ignitions is extremely difficult or even impossible, since the interference on the rate-of-rotation signal increases greatly.

SUMMARY

In an embodiment, the present invention provides a method for recognizing irregular combustion in an internal combustion engine that includes supplying fuel directly to a combustion chamber of a cylinder of the internal combustion engine using an injector. The injector is connected to a fuel supply line that includes a pressure sensor configured to measure pressure in the fuel supply line. The pressure in the fuel supply line is measured during the supply of fuel into the combustion chamber. It is then ascertaining whether irregular combustion is occurring based on the measured pressure in the fuel supply line.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIGS. 2a to 2c show a diagrammatic representation of the controlling of an injector and of the pressure in the fuel supply line; and FIGS. 3a to 3c show a further diagrammatic representation of the controlling of an injector and of the pressure in the fuel supply line.

DETAILED DESCRIPTION

Figure 1:
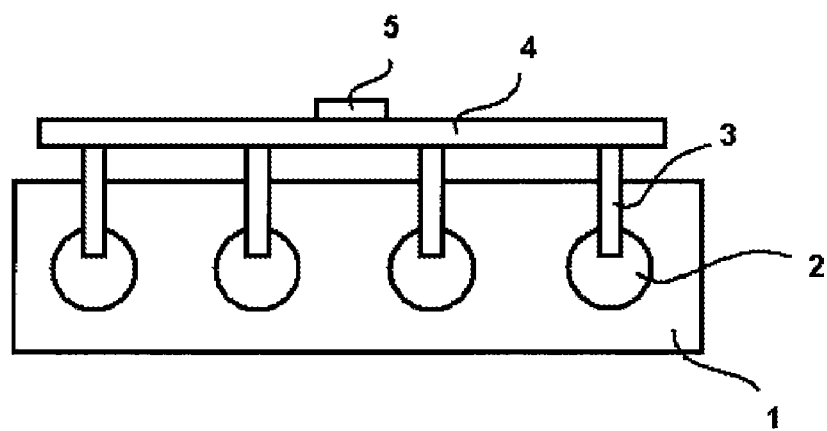
FIG. 1 shows a diagrammatic representation of an internal combustion engine.

An aspect of the present invention, independently of the assumption that a pre-ignition/auto-ignition generates similar high-frequency pressure vibrations in the combustion chamber to knocking combustion, and independently of a consideration of the rate of rotation of the crankshaft, to ensure recognition of every pre-ignition/auto-ignition.

According to an embodiment of the invention, a method is proposed for recognising irregular combustion in an internal combustion engine, wherein the internal combustion engine comprises an injector, wherein by means of the injector fuel is supplied directly to the combustion chamber of a cylinder of the internal combustion engine, wherein the injector is connected to a fuel supply line, wherein the fuel supply line comprises a pressure sensor for measuring the pressure in the fuel supply line, wherein depending upon the measured pressure prevailing during supply of fuel into the combustion chamber in the fuel supply line it is ascertained whether or not irregular combustion is occurring. According to the invention, accordingly the effect is utilised that during the supply of fuel into the combustion chamber there is a connection between the combustion chamber and the fuel supply line, and via the fuel information on the pressure prevailing in the combustion chamber is transmitted into the fuel supply line and can be detected by the pressure sensor arranged there, and is available for further evaluation. In particular, according to the invention, in the event of injection events towards the end of the compression phase up to what is called the ignition TDC (ITDC) there is the possibility of considering in each case the pressure drop which occurs upon each individual supply of fuel into the combustion chamber in the fuel supply line, e.g. upon successive supply operations for fuel into the combustion chamber for individual combustion cycles, and depending upon changes in the pressure drop, in particular in two successive supply operations for two successive combustion cycles, e.g. then to conclude that irregular combustion is occurring if the pressure drop in the current combustion cycle turns out to be lower by a certain value than in the combustion cycle before it, since pre-ignition has occurred, which results in a great increase in the pressure in the combustion chamber. Of course, the pressure drop in the fuel supply line if a pre-ignition is occurring may also completely fail to occur, or even a pressure increase in the fuel supply line may occur as a result. As is generally known, the supply of fuel with the rapid injectors which are available may take place in a plurality of partial quantities. Therefore, in a preferred embodiment of the present invention provision is made that, for recognising an irregular combustion in the combustion chamber, in addition to the supply of fuel proper into the combustion chamber in one or more partial quantities in order to set a certain combustion-air ratio, a further supply of a partial quantity of fuel into the combustion chamber takes place, wherein depending upon the measured pressure prevailing during the additional supply of fuel into the combustion chamber in the fuel supply line it is ascertained whether or not irregular combustion is occurring. This additional partial quantity, which corresponds virtually to a diagnostic supply of fuel into the combustion chamber, is preferably only very small and must not serve for actually setting the combustion-air ratio which is required in each case, but may jointly have some influence in this setting; for example this additional quantity, for ascertaining the combustion chamber pressure, can always be a certain percentage of the amount of fuel necessary for setting a certain combustion-air ratio. According to the invention, therefore, during the supply of fuel proper or preferably in addition to the supply of fuel proper into the combustion chamber, or in the case of an internal combustion engine with a plurality of cylinders of course each of the cylinders, ascertaining of the compression ratios in the combustion chamber takes place indirectly via the pressure in the fuel supply line, it being ascertained using the combustion-chamber pressure which is reflected in the measured pressure in the fuel supply line whether or not irregular combustion is occurring. The supply of fuel proper into the combustion chamber, by at least one opening and at least one closing of the injector, is as a rule concluded before the upper dead centre is reached, in the vicinity of which upper dead centre ignition of the fuel/air mixture takes place, i.e. what is called the ignition TDC (ITDC), with ignition of the fuel/air mixture taking place in the region of the ITDC as the course progresses further. At a high loading of the internal combustion engine, i.e. a high charging pressure and a high temperature level of all the participating media and components adjoining the combustion chamber, the critical conditions occur at which pre-ignitions or auto-ignitions may occur, wherein furthermore, owing to the high probability of the occurrence of knocking combustions, the ignition point lies at or after the ITDC, so that an additional supply according to the invention of fuel into the combustion chamber lies preferably at the ITDC or in a region shortly before and shortly after the ITDC. As is known from the prior art, see for example DE 10 2006 003 265 A1, for each operating point of the internal combustion engine, what is called the compression pressure curve can be calculated as well in the control unit and is available for the evaluation of the pressure difference between the combustion chamber and the fuel supply line in order to ascertain whether or not irregular combustion is occurring. Internal combustion engines in current embodiments with a plurality of cylinders have, at least for groups of individual cylinders, common fuel supply lines (common rail), with a pressure sensor being arranged in the respective common line with which it is possible to detect the pressure in the line with high resolution and thus accurately to detect the pressure drop caused by the supply of fuel into the cylinder, see for example DE 197 40 608 C2, and to provide it for the recognition according to the invention of irregular combustion. According to the invention, advantageously this method can take place independently of the rate of rotation of the crankshaft. The inclusion of a diagnostic supply according to the invention of fuel into the combustion chamber can be integrated without problems into an existing fuel supply pattern, or simply a very small and insignificant supply of fuel can be placed after the fuel-supply operation proper, with merely the time window for measuring pressure in the fuel supply line, optionally the calculation of the compression pressure curve or sections thereof, and the evaluation having to be matched suitably to one another, which is not a problem for the person skilled in the art. Furthermore, the method according to the invention is independent of whether a pre-ignition is accompanied by high-frequency vibrations or not. Further, the method according to the invention can be linked simply to the existing methods, i.e. the consideration of segment period and/or the consideration of the knock signal, so that the reliability of recognition is increased further. It is furthermore advantageous that quantification of the irregular combustion, i.e. at least one classification, for example into the three classes strong/medium/weak, can take place by an analysis of the compression ratios in the fuel supply line during supply of fuel into the combustion chamber.

As shown in FIG. 1, a known internal combustion engine 1 may comprise a plurality of cylinders 2. An injector 3 is associated with each cylinder 2. The injectors 3 are supplied with fuel via a fuel supply line 4, which here is in the form of what is called a "common rail". The injectors 3 are connected to the cylinders 2 or the combustion chambers, so that fuel can be conveyed directly into the cylinders 2. Preferably the injectors 3 are provided with piezo actuators, which are known to respond very rapidly, and thus multiple injection of fuel into the cylinders 2 can take place. A pressure sensor 5 is arranged in the fuel supply line 4, with which sensor, as is already known for example from DE 197 40 608 C2, the fuel pressure can be measured with high resolution, i.e. e.g. with a resolution of 1 degree crank angle. The internal combustion engine 1 is operated in conjunction with a known control unit, which is not shown further. The control unit is of course connected to the pressure sensor 5. The injectors 3 are also connected to the control unit. As is shown in FIG. 2a, for example during the compression stroke of a cylinder 2, i.e. between 540 degrees and 720 degrees crank angle (CA) in the four-stroke cycle, supply of fuel directly into the cylinder 2 may take place in a plurality of partial quantities A, B and C, for example in order to set a combustion-air ratio of lambda=0.9 in a full-load operating point. FIG. 2a in such case shows the control signal of an injector 3, for example the control current I in amperes over the crank angle. According to FIG. 2a, each partial quantity A, B and C has an identical proportion, namely 33.33% of the overall quantity. The partial quantity C is stored in the region of 720 degrees crank angle, so that according to one embodiment of the present invention checking whether a pre-ignition has occurred or not can take place during the supply of the partial quantity C. As shown in FIG. 2b, with each controlling of the injector 3 a pressure drop occurs in the fuel supply line 4. FIG. 2b shows the curve of the pressure in the fuel supply line 4 over the crank angle. This pressure drop, in the event that the internal combustion engine 1 is being operated in a steady-state operating point with a constant combustion-air ratio, considering the individual partial quantities A, B and C, for successive combustion cycles, is of the same or at least virtually of the same amount. In FIG. 2b it can be recognised that the pressure drop upon the supply of the partial quantity A is greater than for the partial quantity B and C, since the pressure in the cylinder 2 becomes greater and greater, the closer the piston comes to the ITDC. Ignition of the fuel/air mixture by means of a spark plug is here provided after the ITDC, as indicated in FIG. 2a with an arrow. FIG. 2c now shows the curve of the pressure in the fuel supply line 4 for a subsequent combustion cycle, all the parameters, in particular relating to the controlling of the injector 3, being the same, but pre-ignition having occurred, i.e. self-ignition having taken place before the ITDC has been reached and before the ignition proper. The pressure drop in the fuel supply line 4 upon the supply of the partial quantities A and B is identical to the preceding combustion cycle. According to the invention, however, the pressure curve during the supply of the partial quantity C, compared with the preceding combustion cycle, gives information about the pre-ignition, since no pressure drop of a comparable amount occurs, but rather a pressure increase occurs in the fuel supply line 4 during the supply of the partial quantity C. This recognition of a pre-ignition can be combined according to the invention with further methods, for example a rate-of-rotation analysis of the crankshaft and/or an analysis of the knock-sensor signal. Assuming that an irregular combustion has been recognised, alone or in conjunction with the aforementioned methods, then countermeasures can be taken, such as for example lowering the charging pressure. According to the invention, a threshold value for the pressure drop in the fuel-pressure line 4 can be specified e.g. also dependent on operating point, which value, if violated, likewise allows the conclusion to be drawn that a pre-ignition is occurring. In a departure from the embodiment just described, where checking whether or not a pre-ignition is occurring takes place during the supply of a partial quantity of fuel directly into the cylinder 2, which partial quantity has to be supplied to the cylinder 2 anyway for setting a certain combustion-air ratio, an additional—virtually diagnostic—supply of fuel into the cylinder 2 may also take place. On this point, FIG. 3a shows that merely one coherent partial quantity A' of fuel is supplied to the cylinder 2 for setting a certain combustion-air ratio. Corresponding to the supply of this partial quantity, a pressure drop takes place in the fuel supply line 4, as shown in FIG. 3b. According to the invention, the supply of a further very small quantity B' of fuel into the cylinder 2 takes place in the region of the ITDC in order to obtain information about the pressure in the cylinder 2 and hence about the possible occurrence of irregular combustion. As shown in FIG. 3b, this supply too causes a certain pressure drop in the fuel supply line 4. Assuming that a pre-ignition occurs in the combustion cycle following the representation in FIG. 3b after the supply of the partial quantity A' and before the ITDC is reached, then according to FIG. 3c a greatly altered behaviour in the fuel pressure is exhibited compared with the preceding combustion cycle, namely no longer a pressure drop, but even a pressure increase. Also the pre-ignitions recognised by means of this embodiment can be linked with the methods previously known from the prior art in order to ensure even more reliable recognition. In this example of embodiment as well, a comparison of the pressure values during the supply of the diagnostic amount of fuel into the cylinder 2 for successive combustion cycles does not necessarily have to take place. A consideration of the violation of any threshold values whatsoever or of certain patterns in the fuel pressure curve during the injection may also take place for recognising pre-ignitions. Independently of the different embodiments mentioned above, ignition by means of a spark plug may also take place chronologically before the ITDC, in which case of course then the supply of fuel which has to be analysed in each case for recognising pre-ignitions has to be placed accordingly chronologically before the ignition point. Any position whatsoever of the supply of fuel at which an evaluation of the pressure in the fuel supply line 4 takes place may be chosen relative to the crank angle and the ITDC. In practice, it will be particularly useful to operate in the region of the ITDC. A calculated compression pressure can also be used for the assessment according to the invention of the pressure in the fuel supply line 4. In particular, a pressure drop which is to be expected can be calculated by means of the calculated compression pressure in the cylinder 2 during the supply phase of fuel, in which an analysis of the pressure in the fuel supply line 4 takes place for recognising pre-ignitions, and using the throughflow characteristic of the injector 3 and the amount of fuel removed from the fuel supply line 4, in which case if said pressure drop does not occur it can just be concluded that a pre-ignition is occurring. According to the invention, the evaluation of the pressure in the fuel supply line 4, upon supply of fuel into a combustion chamber, can be linked with existing methods, such as a consideration of the segment period and/or a consideration of the knock signal. Assuming that an irregular combustion occurs in a combustion cycle and that this combustion can be recognised using a consideration of the knock signal, and the taking of measures to prevent irregular combustion takes place, for example lowering the charging pressure and/or increasing the proportion of fuel in the fuel/air mixture in the subsequent combustion cycle, according to the invention the evaluation according to the invention of the pressure in the fuel supply line 4, upon supply of fuel into a combustion chamber, or an additional diagnostic supply of fuel, may take place in the following combustion cycle or plurality of following combustion cycles. The background to this method is that it was noted in the context of investigations that, starting from a first irregular combustion, which is possibly accompanied by evaluable high-frequency vibrations, frequently in subsequent combustion cycles likewise irregular combustion occurs, in which combustion however the high-frequency vibration portions considerably decrease or even fail to occur, so that by means of the proposed method, after irregular combustion recognised by means of a consideration of the segment period and/or a consideration of the knock signal and measures taken to prevent irregular combustion in subsequent combustion cycles, an evaluation of the pressure in the fuel supply line 4 upon supply of fuel into a combustion chamber takes place which is independent of pressure vibrations which occur and thus serves in subsequent combustion cycles for reliable recognition of possible further irregular combustion.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B." Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise.

The invention claimed is:

1. A method for recognizing irregular combustion in an internal combustion engine, the method comprising:
   supplying fuel directly to a combustion chamber of a cylinder of the internal combustion engine using an injector, the injector being connected to a fuel supply line that includes a pressure sensor configured to measure pressure in the fuel supply line;
   measuring pressure in the fuel supply line during a supply of fuel into the combustion chamber;
   ascertaining whether irregular combustion is occurring based on the measured pressure in the fuel supply line.

2. The method recited in claim 1, wherein irregular combustion is recognized as occurring depending upon a pressure drop in the fuel supply line which occurs upon supply of fuel into the combustion chamber.

3. The method recited in claim 2, wherein irregular combustion is recognized as occurring depending upon the pressure drop occurring in the fuel supply line upon successive combustion cycles during supply of fuel into the combustion chamber.

4. The method recited in claim 3, wherein irregular combustion is recognized as occurring if the pressure drop in the current combustion cycle is smaller by a certain value than in the combustion cycle before it.

5. The method recited in claim 1, wherein the supply of fuel into the combustion chamber using the injector takes place in a plurality of partial quantities in order to set a certain combustion-air ratio, wherein depending upon the measured pressure prevailing during the supply of one of the partial quantities of fuel into the combustion chamber in the fuel supply line it is ascertained whether or not irregular combustion is occurring.

6. The method recited in claim 5, wherein in addition to the supply of fuel into the combustion chamber using the injector in one or more partial quantities in order to set a certain combustion-air ratio, a further supply of fuel into the combustion chamber takes place, wherein depending upon the measured pressure prevailing during this further supply of fuel into the combustion chamber in the fuel supply line it is ascertained whether or not irregular combustion is occurring.

7. The method recited in claim 1, further comprising, if it has been ascertained that an irregular combustion is occurring, performing a check including at least one of determining a change in a rate of rotation of the crankshaft of the internal combustion engine is occurring, which indicates irregular combustion, or determining if a signal of a knock sensor indicates knocking combustion.

8. The method recited in claim 1, wherein quantification of the irregular combustion takes place depending upon the analysis of the compression ratios in the fuel supply line during supply of fuel into the combustion chamber.

9. The method recited in claim 1, wherein the ascertaining of whether or not irregular combustion is occurring depending upon the measured pressure in the fuel supply line prevailing during supply of fuel into the combustion chamber takes place chronologically after ascertaining whether or not irregular combustion is occurring based an analysis of a rate of rotation of a crankshaft of the internal combustion engine, and wherein if irregular combustion has been recognized based on the analysis of the rate of rotation of the crankshaft of the internal combustion engine, the determination of whether or not irregular combustion is occurring based on the measured pressure in the fuel supply line is ascertained in one or a plurality of subsequent combustion cycles.

10. The method recited in claim 1, wherein the ascertaining of whether or not irregular combustion is occurring depending upon the measured pressure in the fuel supply line prevailing during supply of fuel into the combustion chamber takes place chronologically after ascertaining whether or not irregular combustion is occurring based on an analysis of a signal of a knock sensor, and wherein if irregular combustion has been recognized based on the analysis of the signal of a knock sensor, the determination of whether or not irregular combustion is occurring based on the measured pressure in the fuel supply line is ascertained in one or a plurality of subsequent combustion cycles.

* * * * *